Patented June 24, 1941

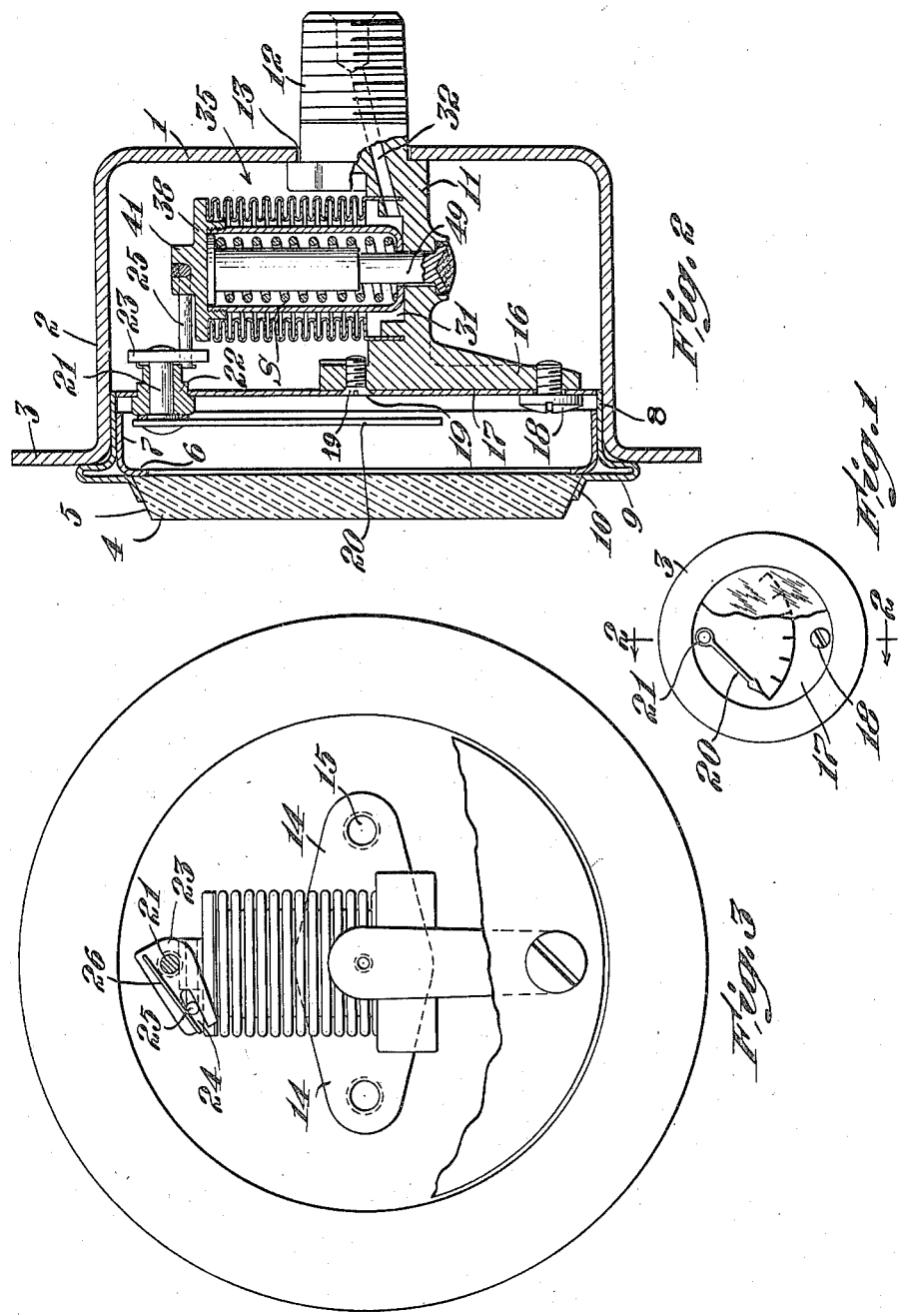

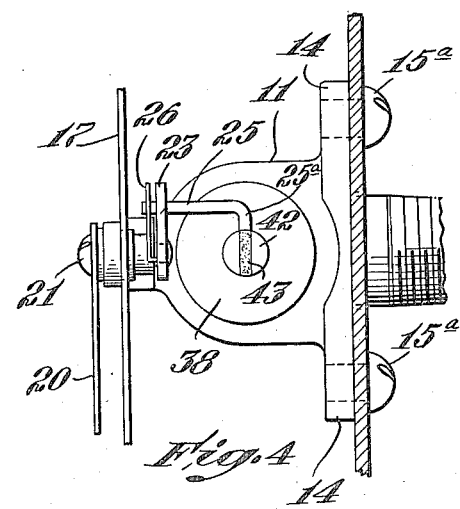
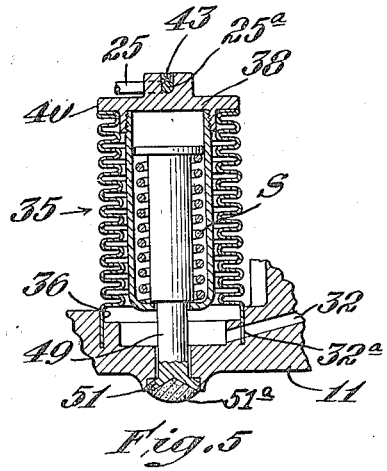
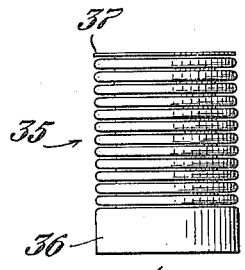
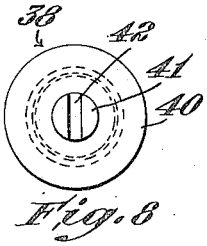
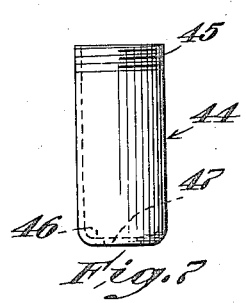
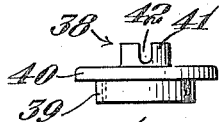
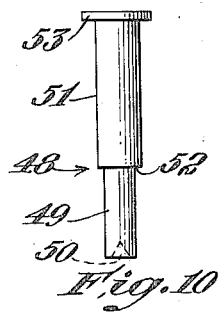
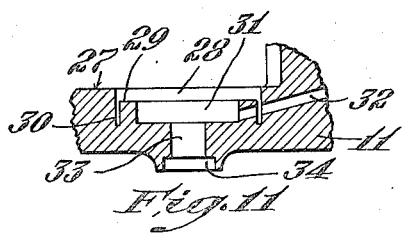

2,247,089

UNITED STATES PATENT OFFICE 2,247,089

BELLOWS-TYPE GAUGE

Frank H. Hopkins, Bridgeport, Conn., assignor to Manning, Maxwell & Moore, Incorporated, New York, N. Y., a corporation of New Jersey Application December 20, 1939, Serial No. 310,211

11 Claims. (Cl. 73—110)

This invention pertains to pressure gauges of the kind in which the pressure-responsive motor device is a hollow part which varies in length in accordance with variations in internal pressure,—for example a metallic bellows of the type commonly known as a "Sylphon." The principal object of the present invention is to provide a gauge of the Sylphon-bellows or equivalent type which will be acceptable for use where it will be subjected to severe vibration and rapid fluctuations in pressure, for instance when used in connection with a portable air compressor or a Diesel engine of portable type.

A further object of the invention is to provide a gauge which will be acceptable under such conditions of extreme vibration as above described and which is further capable of indicating small fluctuations in pressure occurring near the upper end of a high pressure range. Customarily this characteristic results from the use of a spring, either of the compression or tension type, arranged to sustain the initial pressure load. As indicated in the patent to Heise No. 1,723,548, dated August 6, 1929, this load-carrying spring may be secured within the gauge casing and out of contact with the fluid whose pressure is to be measured, but in accordance with the present invention, the load-sustaining spring is arranged within the pressure fluid and housed within the body of the Sylphon bellows. Thus it adds nothing to the space required for the gauge mechanism and necessitates no enlargement of the gauge case to accommodate it.

It has been found that in instruments of this type the accuracy of the gauge reading is dependent both upon the accuracy of the gauge movement in transmitting pressure variations from the bellows and upon the maintenance of constant and positive control of the direction of movement of the Sylphon bellows while expanding and contracting under the influence of internal pressure variations, and in attaining the above objects the invention contemplates the provision of means whereby the movement actuating element, that is to say the movable end of the Sylphon bellows, is at all times compelled accurately to move in a predetermined substantially rectilinear path. The invention further contemplates the use of maximum and minimum stop devices for limiting the travel of said movable end of the Sylphon bellows.

A further object of the invention is to provide a gauge of this type which will have but few moving parts and which may be made easily and at a relatively low cost, and in the attainment of this latter object the invention contemplates, among other things, the employment of a single frame member which supports the bellows, gauge movement, dial and pointer, so that all of the operative parts may be assembled and installed as a unit in the gauge case.

Other and further objects and advantages of the invention not specifically referred to above will be pointed out more fully in the following detailed description and by reference to the drawings, wherein Fig. 1 is a front view of the assembled gauge, to small scale, with a portion of the front glass removed;

Fig. 2 is a vertical section, to larger scale, through the gauge in the plane of the axis of the index shaft;

Fig. 3 is a front view of the gauge with the index and dial removed, and with certain parts in section, the bellows being shown as it appears when the index is at the zero point of the scale.

Fig. 4 is a fragmentary plan view of the gauge movement, the rear wall of the case being in horizontal section and with certain parts broken away;

Fig. 5 is a fragmentary vertical section on the same plane as that of Fig. 2, with certain parts broken away and omitted, and showing the bellows as it appears when the gauge is under maximum pressure;

Fig. 6 is an elevation of the bellows before its assembly with other parts of the gauge;

Fig. 7 is a front elevation of a guide housing or sleeve;

Fig. 8 is a plan view of a cap forming the top closure for the Sylphon bellows;

Fig. 9 is a side elevation of the cap shown in Fig. 8;

Fig. 10 is a side elevation of the guide post for the Sylphon bellows, showing the post before assembly with the other parts; and Fig. 11 is a fragmentary vertical section of the movement-supporting frame of the gauge before assembly of the other parts therewith.

Referring to the drawings the numeral 1 indicates the rear wall of the case of the instrument, such case being of sheet metal or the like, and having the cylindrical side wall 2 which terminates at its forward end in the radial flange 3. A transparent panel 4 of glass or other appropriate material normally closes the front of the case. This panel 4, as here illustrated, has a beveled edge 5. The rear surface of the panel 4 rests against an annular flange 6 forming part of a ring 7 of sheet metal or the like which telescopes within a second (preferably somewhat resilient) ring 8 designed to fit snugly within the forward portion of the casing. This ring 8 extends forwardly beyond the flange 3 of the case and is furnished with a U-bend 9 terminating in a flange 10 which engages the beveled edge 5 of the transparent panel 4. The part 9 provides a certain degree of resiliency whereby the part 10 is caused to bear with substantial pressure against the beveled edge of the panel, and thus hold the latter so firmly against the flange 6 that the panel 4 will not rattle when in use. On the other hand, the front panel 4 may readily be removed from the case merely by pulling the ring 8 forwardly out of the case in which it has a tight sliding fit.

The gauge movement, dial, pointer and associated parts are all mounted upon a rigid supporting frame member or bracket 11 which may, for example, be a unitary casting and which, as here illustrated, comprises the rearwardly directed nipple portion 12, screw threaded for engagement with a coupling or the like at the end of a supply pipe and which passes out through an opening 13 in the rear wall 1 of the case. While the gauge is here shown as of the type in which the nipple 12 extends rearwardly, it is to be understood that so far as the broad aspects of the invention are concerned the invention is equally capable of embodiment in a gauge construction in which the attaching nipple or stem 12 will pass out through an opening in the side wall 2 of the case.

The supporting frame member or bracket 11, as illustrated, is provided with oppositely directed ears 14 (Figs. 3 and 4) which engage the inner surface of the back wall 1 of the case and which are furnished with screw-threaded openings 15 for the reception of attaching screws 15a (Fig. 4) which pass through openings in the rear wall 1.

The supporting frame member or bracket 11 has a downwardly directed leg portion 16 (Fig. 2) to which the dial 17 is secured by means of screws 18 and 19. This dial is properly graduated for cooperation with the index or pointer 20, which is fixed at its upper end (as here illustrated) to a shaft 21 which is free to turn in a bushing 22 passing through an opening in the upper part of the dial 17, the bushing being fixed to the dial in any desired manner and being supported solely by the dial. To the rear end of the shaft 21 is fixedly secured a lever 23 which is provided (Fig. 3) with a longitudinal slot 24 at its free end. This slot receives an actuating pin 25. Preferably a leaf spring 26, fixed in the lever 23, has its free end bearing upon the pin 25 so as to hold the latter against one wall of the slot 24 and thus prevent any backlash.

Referring particularly to Fig. 11, the upper surface 27 of the supporting frame member or bracket 11 is substantially flat and horizontal and is provided with a circular recess 28 having a horizontal floor 29 which is bordered by a narrow annular groove 30 in the substance of the bracket. The central portion of the recess 28 is deepened to form a chamber 31 into which leads a passage 32 which communicates with the interior of the nipple 12, thus admitting pressure fluid to the chamber and the space within the bellows. An axial bore 33 leads downwardly from the chamber 31 and terminates at the under side of the bracket in a diametrically enlarged recess 34.

The motor element of the gauge as here illustrated is a metallic bellows 35 of the type commonly known as a "Sylphon." This bellows, as illustrated in Fig. 6, comprises the substantially cylindrical lower part 36 and the substantially horizontal, upper terminal flange 37,—the material of the bellows intermediate the parts 36 and 37 being formed into horizontal folds in the usual manner of such devices. The upper end of this bellows 35 is normally closed by a rigid cap 38 (Figs. 8 and 9) said cap having the annular boss 39 which fits down within the upper part of the bellows 35 and which is internally screw threaded. The cap also comprises the radial flange 40 with which the flange 37 of the bellows contacts and to which the flange 37 is permanently secured to form a leak-tight joint, for example by solder, brazing, or the like. The cap 38 also has an upwardly directed boss 41 having a diametrical slot 42 which receives a part 25a of the actuator pin 25 above described, said part 25a, as illustrated, being disposed at right angles to the main portion of the pin 25, and being seated in the slot 42 in which it is securely and permanently fixed, for example by solder 43 (Figs. 4 and 5) or the like.

In accordance with the present invention, the path of movement of the cap or movable end of the bellows is accurately controlled. To this end, an elongate cylindrical cup, guide housing or sleeve, screw threaded at its upper end at 45 is arranged within and coaxial with the bellows, the external diameter of the cup being slightly less than the inner diameter of the bellows. The screw threads at the upper end of the cup unite it to the annular flange 39 of the cap 38. This elongate cup or housing 44 has an inwardly directed annular flange 46 at its lower end, defining a central aperture 47. This flange constitutes a stop element, and also an abutment for a loading spring S housed within the cup 44, if such spring be employed.

A guide post 48 is arranged within the cup 44. This post is of rigid material, for example bronze or steel, and has the lower part 49 which fits within the bore 33 of the bracket. The lower end of the post is initially provided with a conical recess 50 (Fig. 10) or alternatively said lower end may be split, so that when mounted in the bracket this lower portion of the post may be splayed out or headed over, as shown at 51 (Fig. 5) so as substantially to fill the recess 34 at the lower end of the bracket. The lower end of the post is then permanently secured in place by means of solder 51a or by welding or brazing. The axis of the part 49 is in accurate axial alignment with the axis of the bore 33 in which it fits snugly, and thus the post is accurately concentric with the annular groove 30 in the bracket. The upper part 51 of the post 48 is of larger diameter than the part 49,—providing an abrupt radial stop shoulder 52, and the upper end of the post is furnished with a radial flange forming a head 53, the head 53 constituting an abutment for the upper end of the loading spring S, the latter normally tending to force the cup 44 downwardly until the inner surface of the cap 38 engages the upper surface of the head 53. The aperture 47 in the bottom of cup 44 is of such diameter as to provide a snug sliding fit between the inner edge of the flange 46 and the lower or stem portion 49 of the post 48, while the diameter of the flange or head 53 at the top of the post is such as to provide a snug sliding fit between the outer edge of said flange or head and the inner surface of the cup 44.

When the parts are assembled, the lower cylindrical portion 36 of the bellows is seated within the annular groove 30 of the bracket and is permanently secured to the bracket so as to form a leakproof joint by means of solder, brazing or the like. At the proper point this cylindrical part 36 of the bellows is furnished with a slot 32ª (Fig. 5) which is disposed in registry with the passage 32, so that said passage is not obstructed by the part 36.

In assembling the parts, the spring S is first slid onto the post 48 and then both are inserted in the cup or housing 44. The cap 38 is then screwed onto the upper end of the cup 44, and the bellows is now slipped over the cup and the lower end of the post 48 is pushed down into the bore 33. The lower extremity of the post is now fixed to the bracket, as above described. The bellows is soldered or welded at its lower part to the bracket and at its upper part to the flange 40 of the cap 38. The part 25ª of the pin 25 is now fixed to the cap 38. The dial having assembled therewith the pointer, bushing 22, shaft 21 and lever arm 23, is now mounted in place with the pin 25 disposed in the slot 24 of the lever arm. Preferably the opening in the dial which receives the screw 18 is of somewhat larger diameter than the screw so that by loosening the screws 18 and 19 the dial may be turned about the central screw 19 as an axis. In thus swinging the dial, the bushing 22 is moved bodily and in this way the position of the pin 25 in the slot 24 is slightly varied, thus allowing for calibration of the gauge merely by adjustment of the dial. When the proper adjustment has been made the screws 18 and 19 are tightened, thus holding the parts in operative position.

The above arrangement furnishes support for the movable end of the flexible, elongate bellows and provides for guiding the actuating pin 25 in a straight line, regardless of any tendency of the bellows, when subjected to internal pressure, to bend or deflect toward one side or the other, as sometimes happens due to imperfections in the material of the bellows, location of the gauge, vibration, or otherwise, and thus the actuating pin 25 is constrained always to move in exactly the same path as the pressure varies. Thus accuracy of gauge reading is assured, particularly since the motion of the pin 25 is transmitted so directly to the pointer without possibility of lost motion.

While the means for transmitting movement from the pin 25 to the pointer, as here disclosed, is a preferred construction, it is to be understood that the invention is not necessarily limited to this type of gauge movement, but that the accurate rectilinear motion of the pin 25 may be transmitted to the pointer by means of other types of mechanism, without departing from the broader aspects of the invention. Furthermore, while the loading spring S is desirable, particularly when the gauge is to be used for certain specified purposes, for example as more fully pointed out in the patent to Heise No. 1,723,548, above referred to, it is to be understood that for other purposes the loading spring S may be omitted. It is further to be understood that changes in materials, specific relative location of parts, changes in dimensions, etc., may be made without departing from the invention as set forth in the appended claims.

I claim:

1. An instrument of the class described including a movable element, a motor device comprising a part having a chamber for pressure fluid, means providing a passage for the admission of pressure fluid to said chamber, a portion of the wall of the chamber being movable in response to variations in pressure in said chamber, guide means constraining said movable portion of the chamber wall to move in a rectilinear path, said guide means comprising a rigid post concentric with said chamber and having one end fixedly supported, the opposite end of the post having a head of a diameter greater than that of the body of the post, a guide sleeve carried by the movable wall of the chamber and which has sliding engagement with the head of the post, and a loading spring coiled about the post, the external diameter of the spring being less than that of the head of the post, one end of the spring bearing against the head of the post, the guide sleeve having an abutment element with which the opposite end of the spring engages, and means operative to transmit motion from said movable portion of the chamber wall to said movable element.

2. An instrument of the class described including a movable element, a bellows device having a movable end which moves in response to variations in pressure within the bellows, means providing a passage for the admission of pressure fluid to the interior of the bellows, guide means operative to guide said movable end so as to move in an accurately rectilinear path, said guide means comprising a rigid post concentric with the bellows, said post being fixedly supported at one end, and a part secured to the movable end of the bellows and having sliding engagement with the post, the post comprising stop elements operative to limit movement of the movable end of the bellows in both directions, and means for transmitting motion from said movable end of the bellows to the movable element.

3. An instrument of the class described, including a movable element, a bellows device having an end which moves in response to variations in pressure within the bellows, means providing a passage for the admission of pressure fluid to the interior of said bellows, means operative to transmit motion from said movable end of the bellows to the movable element, and guide means housed within the bellows and which is operative to constrain said movable end to move in an accurately rectilinear path, said guide means comprising a rigid post concentric with the bellows, one end of the post being adjacent to the movable end of the bellows and the opposite end of the post being fixedly supported, the post having a head at its free end, a rigid guide element fixed to the movable end of the bellows and which is always in sliding contact with a portion of the post, the parts being so constructed and arranged that said guide element is constrained by such contact with the post to move in a rectilinear path as the bellows expand and contract, a loading spring coiled about the post with one end of the spring engaging the head of the post, and means carried by the movable end of the bellows constituting an abutment for the opposite end of the spring.

4. An instrument of the class described including a movable element, a supporting bracket, and a bellows having one end fixed to the bracket, the opposite end of the bellows being free to move and being provided with an end closure, and means for transmitting motion from said end closure to the movable element, means providing a passage for the admission of pressure fluid to the interior of said bellows, a rigid guide post within the bellows, one end of the post being fixed to the bracket, and the opposite end of the post having a head of larger diameter than the body of the post, a guide sleeve fixed to the movable end closure and concentric with the post, said sleeve being of such internal diameter as to have sliding contact with the head of the post and having an apertured flange at its free end which has sliding engagement with the body portion of the post, said sleeve and post defining between them an annular chamber, and a loading spring housed within said chamber.

5. An instrument of the class described including a movable element, a supporting bracket, and a bellows having one end fixed to the bracket, the opposite end of the bellows being free to move and being provided with an end closure, and means for transmitting motion from said end closure to the movable element, means providing a passage for the admission of pressure fluid to the interior of the bellows, a rigid guide post within the bellows, one end of the post being fixed to the bracket, a sleeve member coaxial with the post and having one end fixed to the movable end closure of the bellows, the post and sleeve having pairs of complemental guide elements spaced longitudinally of the post and operative to constrain the sleeve and end closure to move in an accurately rectilinear path.

6. An instrument of the class described including a movable element, a support, and a bellows having one end fixed to the support, the opposite end of the bellows being free to move and being provided with an end closure, and means for transmitting motion from said end closure to the movable element, a rigid guide post within and coaxial with the bellows, one end of the post being fixed to the support, a sleeve coaxial with the post and having one end fixed to the movable end closure of the bellows, the opposite end of the sleeve having an axial aperture which receives the post with a sliding fit, the free end of the post being provided with a part having a sliding fit within the sleeve, the sleeve and post cooperating to guide the end closure of the bellows in a rectilinear path.

7. An instrument of the class described including a movable element, a support, and a bellows having one end fixed to the support, the opposite end of the bellows being free to move and being provided with an end closure, and means for transmitting motion from said end closure to the movable elevent, a rigid guide post within and coaxial with the bellows, one end of the post being fixed to the support, the free end portion of the post being of larger diameter than that portion which is fixed to the bracket, the post having a stop shoulder at the junction of its larger and smaller portions, the free end of the post having a head, a sleeve coaxial with the post, one end of the sleeve being secured to the movable end closure of the bellows, the sleeve being of such internal diameter as to receive the head of the post with a sliding fit, and the opposite end of the sleeve having an axial aperture which receives the smaller end portion of the post with a sliding fit.

8. In an instrument of the class described a movable element, a support, and a bellows having one end fixed to the support, the opposite end of the bellows being free to move and being provided with an end closure, and means for transmitting motion from said end closure to the movable element, means providing a passage for the admission of pressure fluid to the interior of the bellows, a post within the bellows, one end of the post being fixed to the support, the post and end closure having cooperable stop elements designed to limit longitudinal collapse of the bellows.

9. In an instrument of the class described a movable element, a support, and a bellows having one end fixed to the support, the opposite end of the bellows being free to move and being provided with an end closure, and means for transmitting motion from said end closure to the movable element, a rigid guide post within the bellows, one end of the post being fixed to the support, an elongate cylindrical sleeve-like cup coaxial with the post, the top of the cup being fixed to the end closure of the bellows, and the bottom of the cup having an axial aperture for the reception of the post, the post having a stop shoulder engageable with the bottom of the cup thereby to limit expansion of the bellows.

10. In an instrument of the class described a movable element, a support, and a bellows having one end fixed to the support, the opposite end of the bellows being free to move and being provided with an end closure, and means for transmitting motion from said end closure to the movable element, a rigid post within and coaxial with the bellows, one end of the post being fixed to the support, said post having a pair of stop elements spaced longitudinally thereof, the movable end closure for the bellows being provided with elements which are respectively engageable with the stop elements of the post thereby to limit movement of the end closure in both directions.

11. In an instrument of the kind having a dial, an index, a shaft to which the index is secured, a bellows type pressure-motor having a movable end, and means for constraining said movable end to move in a rectilinear path, means for transmitting motion from said movable end of the bellows to the pointer shaft, including a lever fixed to the shaft, the lever having an elongate slot, a pin secured to the movable end of the motor bellows, said pin projecting into the slot in the lever, the index shaft being mounted in a bearing carried by the dial, and means supporting the dial to turn about an axis spaced from that of the shaft, whereby the instrument may be calibrated by turning the dial thereby causing movement of the pin longitudinally of the slot.

FRANK H. HOPKINS.